US007120000B2

(12) United States Patent
Pidutti et al.

(10) Patent No.: US 7,120,000 B2
(45) Date of Patent: Oct. 10, 2006

(54) CIRCUIT FOR THE PROGRAMMABLE PROTECTION OF OUTPUT OVER-VOLTAGES IN A POWER FACTOR CORRECTOR

(75) Inventors: Albino Pidutti, Udine (IT); Stefano Beria, Pavia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 324 days.

(21) Appl. No.: 10/631,670

(22) Filed: Jul. 31, 2003

(65) Prior Publication Data
US 2005/0270713 A1 Dec. 8, 2005

(30) Foreign Application Priority Data
Aug. 1, 2002 (EP) .................... 02425506

(51) Int. Cl.
H02H 9/04 (2006.01)
G05F 1/40 (2006.01)
(52) U.S. Cl. ..................... 361/91.1; 323/284
(58) Field of Classification Search ............ 361/91.1; 323/284
See application file for complete search history.

(56) References Cited

U.S. PATENT DOCUMENTS 4,940,929 A  7/1990  Williams
5,046,098 A * 9/1991  Mandell et al. ............. 381/22
5,285,148 A * 2/1994  Uhlenhoff et al. .......... 323/272
5,502,370 A * 3/1996  Hall et al. .................. 323/284
5,612,610 A * 3/1997  Borghi et al. ............... 323/222
5,862,045 A * 1/1999  Halamik et al. ............. 363/97

FOREIGN PATENT DOCUMENTS

EP         0701317        3/1996

\* cited by examiner

Primary Examiner—Chau N. Nguyen
Assistant Examiner—Scott Bauer
(74) Attorney, Agent, or Firm—Lisa K. Jorgenson; Jon A. Gibbons; Fleit, Kain, Gibbons, Gutman, Bongini & Bianco P.L.

(57) ABSTRACT

The present invention refers to a switching power supply, in particular to a power factor corrector, and more particularly to a circuit for the programmable protection against output over-voltages. It also refers to a power factor corrector integrated circuit comprising a circuit for the programmable protection against output over-voltages. In one embodiment the circuit for the programmable protection against output over-voltages in a power Factor corrector comprises means for detecting a signal proportional to the output voltage; a first preset reference voltage; a second preset reference voltage; a transconductance amplifier which receives in input the signal proportional to the output voltage and the first preset reference voltage; a comparator which receives in input the signal proportional to the output voltage and the second preset reference voltage; means suitable for absorbing a current coming from the signal proportional to the output voltage.

9 Claims, 1 Drawing Sheet

CIRCUIT FOR THE PROGRAMMABLE PROTECTION OF OUTPUT OVER-VOLTAGES IN A POWER FACTOR CORRECTOR

CROSS-REFERENCE TO RELATED APPLICATIONS

This application is based upon and claims priority from prior European Patent Application No. 02425506.9, filed on Aug. 1, 2002, the entire disclosure of which is herein incorporated by reference.

BACKGROUND OF THE INVENTION

1. Field of the Invention

The present invention generally refers to a switching power supply, in particular a power factor corrector (PFC), and more particularly to a circuit for the programmable protection of output over-voltages and an integrated circuit comprising a circuit for the programmable protection against output over-voltages.

2. Description of the Prior Art

A power supply consisting of a full-wave rectifier bridge and a filter capacitor connected immediately downstream produces a non-regulated direct voltage starting from a sinusoid alternating voltage main. The capacitance of the filter capacitor is large enough that, at the leads of the capacitor, there is a relatively small ripple compared to the continuous D.C. level. The rectifier diodes of the bridge therefore will conduct only for a small portion of each half-cycle, given that the instantaneous value of the line voltage is lower than the voltage on the filter capacitor for the majority of the cycle. It follows then that the current drawn from the voltage main consists of a series of sharp pulses whose width is 5–10 times the resulting average value.

These sharp pulses present considerable consequences and shortcomings. On shortcoming is the absorption of sinusoidal current, the current absorbed from the voltage main has much greater peak and effective values and the voltage main is distorted by effect of the pulsed absorption.

In order to mitigate the consequence of sharp pulses, switching techniques are used. These switching techniques include a power factor corrector (PFC), positioned between the rectifier bridge and the filter capacitor. Using a PFC, a nearly sinusoidal current is absorbed from the voltage main, which is in phase with the voltage. This PFC moves the power factor near 1 and reducing the Total Harmonic Distortion (THD).

Usually the switching configuration called boost is used, which generates a direct voltage that is greater than the maximum voltage main peak voltage, typically 400V for systems powered with European or with universal voltage main.

The power factor corrector comprises a control loop which, starting from information relating to the output voltage (Vout), regulates the turn-on or turn-off of a power transistor whose function is substantially that of a switch.

The analysis of the control loop bandwidth shows the presence of a very low crossover frequency, a fact that inevitably leads to definitely slow controller response times.

This characteristic of the loop is however absolutely necessary to prevent the output voltage from being able to follow the sinusoidal shape of the rectified voltage main, no longer supplying, as a consequence, a nearly direct voltage.

Nevertheless, there are situations in which the reduced bandwidth is an important limit that may lead to several components of the circuit being damaged.

As an example, let us presume, that a sudden load variation occurs, such that the current requested passes, for example, from 100% to 10% or less.

For the reason given previously, the controller is not capable of adjusting in a sufficiently short time to the new operating conditions, therefore an over-voltage is generated on the output node which, if reaching too high values, could damage the discrete components of the pre-regulator stage, in particular the power transistor and the filter capacitor.

Accordingly, a need exists to overcome the problems with the prior art and to provide a protection circuit to protect against the output over-voltages

SUMMARY OF THE INVENTION

The present invention overcomes the problems with the prior art and provides a circuit for the programmable protection against output over-voltages, which enables the external power transistor to be turned off until particular preset operating conditions are reached.

In accordance with the present invention, this scope is reached by means of a circuit for the programmable protection against output over-voltages in a power factor corrector comprising means for detecting a signal that is proportional to the output voltage; a first preset reference voltage; a second preset reference voltage; a transconductance amplifier that receives in input the signal proportional to the output voltage and the first preset reference voltage; a comparator that receives in input the signal proportional to the output voltage and the second preset reference voltage; means suitable for absorbing a current coming from the signal proportional to the output voltage.

BRIEF DESCRIPTION OF THE DRAWING

The subject matter, which is regarded as the invention, is particularly pointed out and distinctly claimed in the claims at the conclusion of the specification. The foregoing and other features, and advantages of the invention will be apparent from the following detailed description taken in conjunction with the accompanying drawings.

DESCRIPTION OF THE PREFERRED EMBODIMENTS

Figure 1:
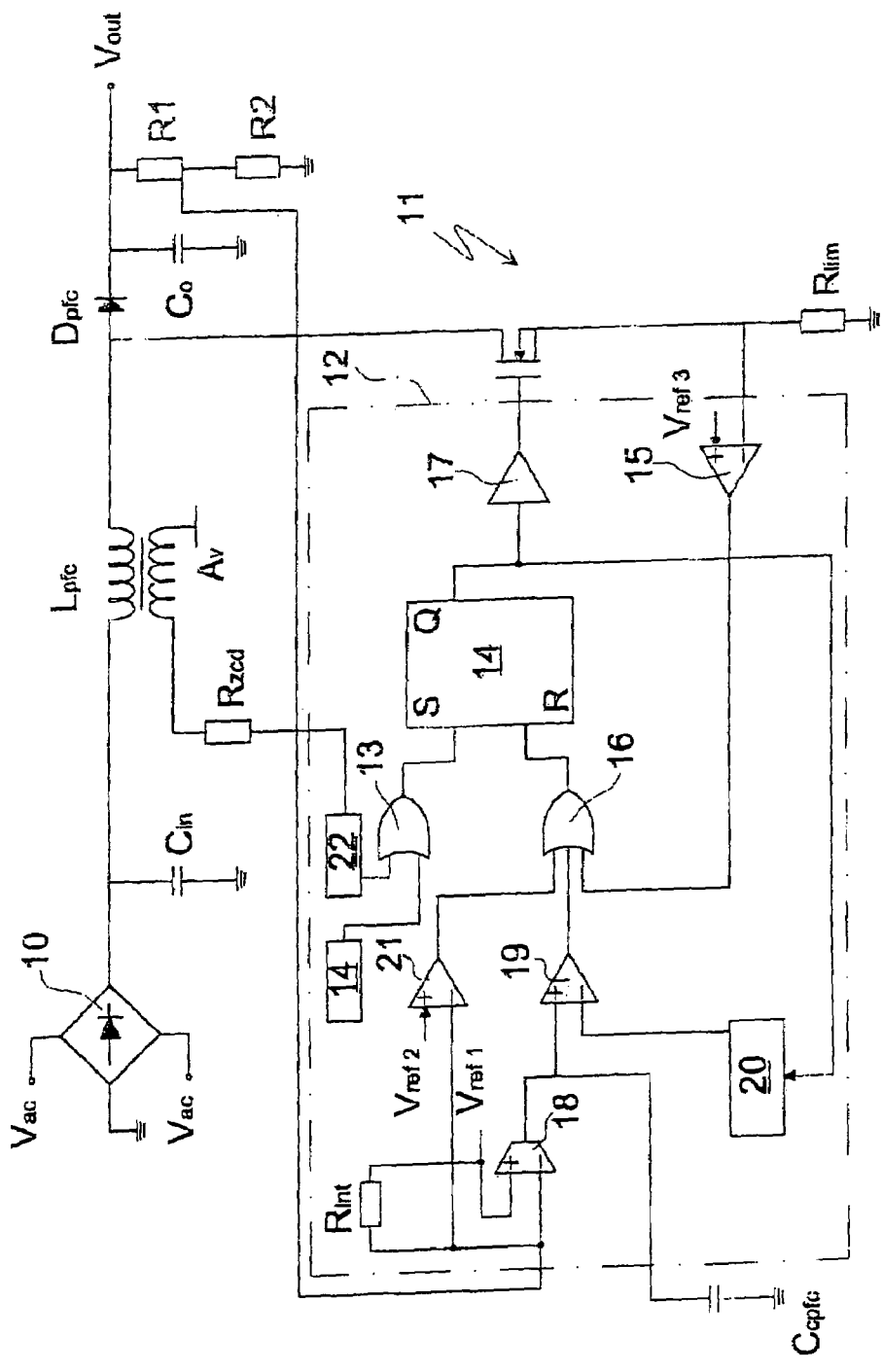
FIG. 1 is an electronic schematic of a programmable circuit for protection against over-voltages in accordance with the present invention.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals refer to like parts through several views.

The characteristics and advantages of the present invention will be evident from the following detailed description of an embodiment thereof, illustrated as non-limiting example in the enclosed drawing which shows a power factor corrector (PFC) comprising a circuit for the programmable protection against output over-voltages in accordance with the present invention.

The PFC comprises a bridge of diodes 10 connected to the Vac voltage main, a capacitor Cin connected between the output of the bridge of diodes 10 and ground, an inductance Lpfc connected between the output of the bridge of diodes 10 and the anode of a rectifier diode Dpfc, a capacitor Co connected between the cathode of the rectifier diode Dpfc and ground. The voltage Vout on the capacitor Co is the output voltage of the PFC. A transistor 11 has the drain connected in the node of connection between the inductance Lpfc and the diode Dpfc, the source connected to a resistance Rlim, in turn connected to ground. A voltage divider composed of resistances R1 and R2 is applied between the voltage Vout and ground.

The PFC stage comprises a power factor corrector controller 12, which receives in input the voltage present in the connection node between the resistance R1 and the resistance R2. It receives the voltage present on the inductance Lpfc detected by means of a winding Av, wound on the same core as the inductance Lpfc; the voltage on the winding Av is fed to the power factor corrector 12 by means of a resistance Rzcd. It also receives the voltage present on the resistance Rlim.

It delivers the driver signal of the transistor 11.

The voltage on the winding Av, fed to the power factor corrector 12 by means of a resistance Rzcd, is applied to a circuit 22 for detecting the zero crossing, whose output is connected to an input of the circuit OR 13, the output of a flip-flop circuit 14 is connected to the other input of the circuit OR 13. The output of the circuit OR 13 is connected to the input S of a flip flop 14.

The voltage present on the resistance Rlim is applied to the inverting input of a comparator 15, a reference voltage Vref3 is applied to the non-inverting input of the comparator 15. The output of the comparator 15 is connected to a first circuit input OR 16 (with three inputs).

The output Q of the flip flop 14 is connected to a driver circuit 17, which supplies the driver signal of the gate of the transistor 11, the output is also connected to the input of a sweep generator 20.

The voltage present at the connection node between the resistance R1 and the resistance R2 is applied to the inverting input of a transconductance amplifier 18, and to the inverting input of a comparator 21.

A reference voltage Vref2 is applied to the non-inverting input of the comparator 21. The output of the comparator 21 is connected to the second circuit input OR 16.

The output of the transconductance amplifier 18 is connected to the non-inverting input of a comparator 19, and to the leads of a capacitor Ccpfc. The output of the comparator 19 is connected to the third circuit input OR 16. The output of the circuit OR 16 is connected to the input R of the flip flop 14. The output of the sweep generator 20 is connected to the inverting input of the comparator 19.

A reference voltage Vref1 is applied to the non-inverting input of the transconductance amplifier 18. A resistance Rint is connected between the non-inverting input and the inverting input of the transconductance amplifier 18.

The comparator 15 is used as loop control. The sweep generator 20 serves to determine the instants of activation of the circuit. The transconductance amplifier 18 and the comparators 19 and 21 are used as the feedback of the output voltage and as a protection against output over-voltages.

The reference voltage Vref1 is used for the regulation of the output voltage Vout. The reference voltage Vref2 is used to detect over-voltages of the output voltage Vout. The reference voltage Vref3 is used as current limiter of the transistor 11.

Under normal operating conditions the control loop sets the voltage at the inverting node of the transconductance amplifier 18 at the value Vref1 and the output voltage Vout of the power factor corrector is worth Vo. In this case we have:

$$I_{R1} = I_{R2} = \frac{Vref1}{R2} = \frac{-Vo - Vref1}{R1}$$

$$I_{Rint} = 0$$

In presence of over-voltages at the output node of the power factor corrector, when Vout reaches the maximum voltage allowed Vo+$\Delta V_{max}$, the inverting input is at a value equal to Vref2; summing up the currents at the node the following can be written:

$$I_{R1} = I_{R2} + I_{Rint}$$

$$\frac{Vo - Vref2 + \Delta V_{max}}{R1} = \frac{Vref2}{R2} + \frac{Vref2 - Vref1}{Rint}$$

Only taking the differential components into consideration we have:

$$\frac{\Delta V_{max} - \Delta Vref}{R1} = \frac{\Delta Vref}{R2} + \frac{\Delta Vref}{Rint}$$

having indicated with $\Delta V_{ref}$:

$$\Delta Vref = Vref2 - Vref1$$

Then neglecting $\Delta V_{ref}$ in regard to $\Delta V_{max}$ we have:

$$\frac{\Delta V_{max}}{R1} = \frac{\Delta Vref}{R2} + \frac{\Delta Vref}{Rint}$$

$$\Delta V_{max} = \Delta Vref \cdot \frac{R1}{R2} + \Delta Vref \cdot \frac{R1}{Rint}$$

In this case, with the reference voltages Vref1 and Vref2 internally preset, the ratio R1/R2 is defined in function of the voltage Vo delivered by the power factor corrector under normal operating conditions.

With this solution the intervention voltage of the protection circuit is programmed by selecting suitably the ratio $R1/R_{int}$ according to the needs.

The solution that adopts the integrated resistance $R_{int}$ is definitely the most simple. Nevertheless, as V=Rl=(1/gm)*I the same function could be implemented using a transconductance amplifier instead of the resistance, which carries out the same function.

The basic concept to guarantee the programmability is that in presence of over-voltages, a part of the "signal" current coming from R1 and directed in R2 is absorbed inside the device.

Taking a numeric example in the case of using a resistance Rint, and setting Vo=400V, Vref1=2.5V, Vref2=2.6V, Rint=4.16KΩ, and consequently R1/R2=160, we would have:

$$\Delta V_{max} = 0.1 \text{ V} \cdot 160 + 0.1 \text{ V} \frac{R1}{Rint}$$

$$\Delta V_{max} = 16 \text{ V} + 0.1 \text{ V} \frac{R1}{Rint}$$

For example, wanting to program $\Delta V_{max} = 40V$ from the previous equation we would obtain $R1=1M\Omega$ and then we could calculate $R2=R1/160=6.25K\Omega$. Preferably all the circuits described relating to the power factor corrector 12 (possibly with the exception of the capacitor Ccpfc) are contained in one integrated circuit with 8 pin.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A circuit for the programmable protection of output over-voltages in a power factor corrector comprising:
    means for detecting a signal proportional to an output voltage;
    a first preset reference voltage;
    a second preset reference voltage;
    a first transconductance amplifier with an input connected to the signal proportional to the output voltage and a second input connected to the first preset reference voltage;
    a comparator with a first input connected to the signal proportional to the output voltage and a second input connected to the second preset reference voltage; and
    means suitable for absorbing a current coming from the signal proportional to the output voltage, wherein the current is absorbed in response to the signal proportional to the output voltage exceeding a given value.

2. The circuit of claim 1, characterized in that the means suitable for absorbing a current coming from the signal proportional to the output voltage is coupled between the first input and a second input of the transconductance amplifier.

3. The circuit of claim 1, characterized in that the means suitable for absorbing a current coming from the signal proportional to the output voltage includes a resistor.

4. The circuit of claim 1, characterized in that the means suitable for absorbing a current coming from the signal proportional to the output voltage includes a second transconductance amplifier.

5. A circuit for the programmable protection of output over-voltages comprising:
    a voltage divider connected between an output voltage and a ground reference signal for detecting a signal proportional to the output voltage;
    a power factor controller (PFC) coupled to the signal proportional to the output voltage, the PFC including:
        a first transconductance amplifier with a first input connected to the signal proportional to the output voltage and a second input connected to a first preset reference voltage;
        a comparator with a first input connected to the signal proportional to the output voltage and a second input connected to the second preset reference voltage; and
        at least one of a resistor and a second transconductance amplifier coupled to the first input and the second input of the first transconductance amplifier for limiting a current coming from the signal proportional to the output voltage, wherein the current is limited in response to the signal proportional to the output voltage exceeding a given value.

6. The circuit of claim 5, characterized in that the first preset reference voltage is used for regulation of the output voltage.

7. The circuit of claim 6, characterized in that the second preset reference voltage is used to detect over-voltages of the output voltage.

8. The circuit of claim 5, further comprising:
    a transistor coupled to PFC and a third preset voltage reference, which is turned-off during over-voltages of the output voltage.

9. A power factor corrector integrated circuit comprising:
    a voltage divider connected between an output voltage and a ground reference signal for detecting a signal proportional to the output voltage;
    a power factor controller (PFC) coupled to the signal proportional to the output voltage, the PFC including:
        a first preset reference voltage;
        a second preset reference voltage;
        a first transconductance amplifier with a first input connected to the signal proportional to the output voltage and a second input connected to the first preset reference voltage;
        a comparator with a first input connected to the signal proportional to the output voltage and a second input connected to the second preset reference voltage; and
    at least one of a resistor and a second transconductance amplifier coupled to the first input and a second input of the transconductance amplifier for limiting a current coming from the signal proportional to the output voltage, wherein the current is limited in response to the signal proportional to the output voltage exceeding a given value.

* * * * *